Figure 1:
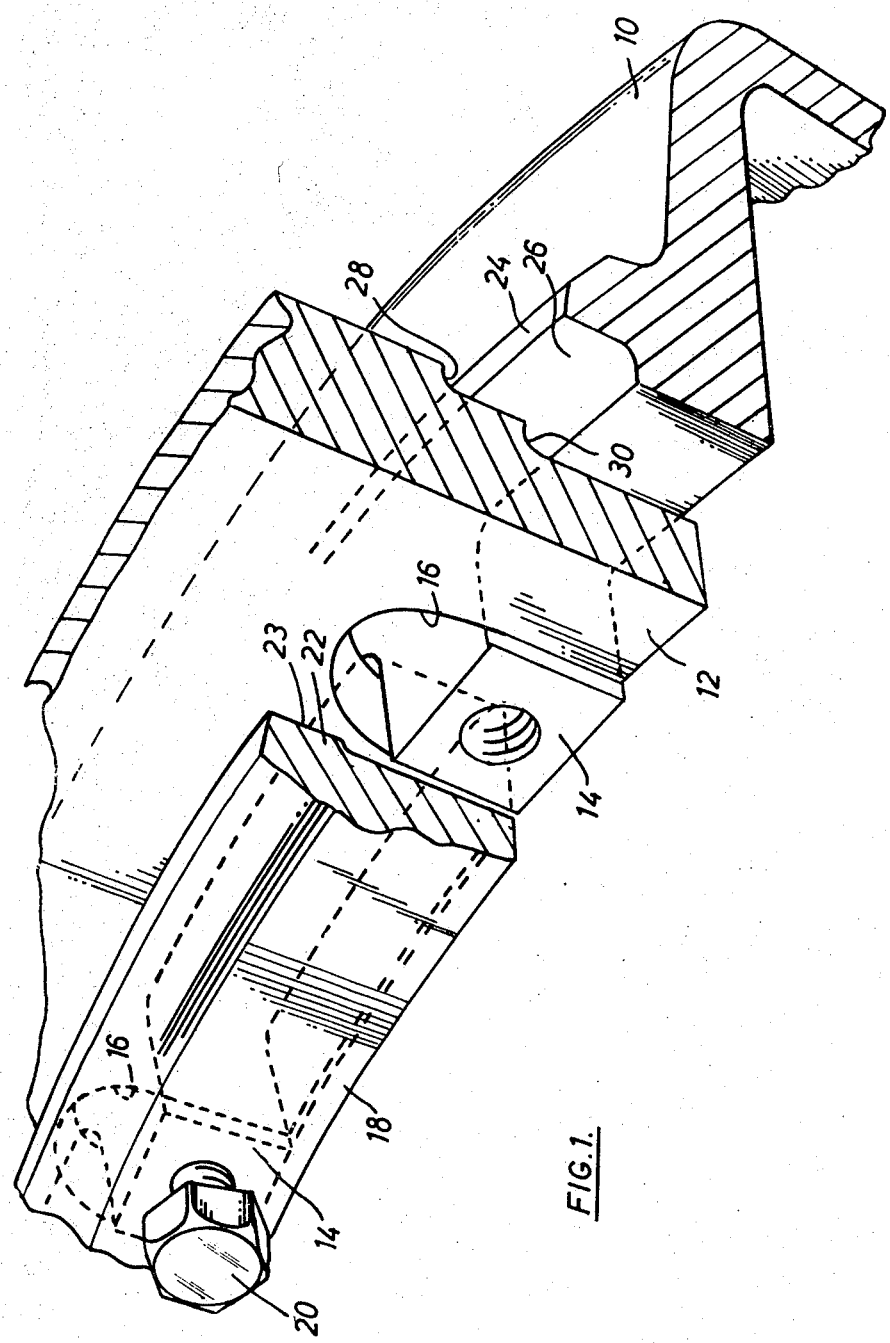

United States Patent

[11] 3,542,166

| | | |
|---|---|---|
| [72] | Inventor | Anthony William Harrison<br>Birmingham, England |
| [21] | Appl. No. | 773,998 |
| [22] | Filed | Nov. 7, 1968 |
| [45] | Patented | Nov. 24, 1970 |
| [73] | Assignee | Girling Limited<br>Birmingham, England |
| [32] | Priority | Nov. 9, 1967 |
| [33] | | Great Britain |
| [31] | | No. 50,960/1967 |

[54] BRAKE DISC AND SUPPORTING MEANS THEREFOR
9 Claims, 3 Drawing Figs.

[52] U.S. Cl. ..................................... 188/218, 192/107
[51] Int. Cl. ..................................... F16d 65/12
[50] Field of Search ........................... 188/218Axial A, 18A; 192/70.16, 70.19, 70.2, 107

[56] References Cited

UNITED STATES PATENTS

| | | | |
|---|---|---|---|
| 3,295,641 | 1/1967 | Eaton et al. | 188/218(Axial) |
| 3,361,228 | 1/1968 | Nectoux | 188/218(Axial) |

FOREIGN PATENTS

| | | | |
|---|---|---|---|
| 1,200,338 | 9/1965 | Germany | 188/218(Axial) |

*Primary Examiner*—George E. A. Halvosa
*Attorney*—Scrivener, Parker, Scrivener and Clarke ABSTRACT: A brake disc unit comprises a bell and a separate disc. The bell has axially projecting castellations which fit into corresponding radially directed slots in the disc and has a radial surface separate and spaced from the castellations for locating the disc. The disc and the bell are secured together by a resilient clamping member. Embodiments of the clamping member include a "bellville" or other resilient washer bolted to the tops of the castellations and a "bellville" washer retained in position by a circlip located in a groove cut in the castellations. The invention permits relative radial movement between the disc and the bell.

BRAKE DISC AND SUPPORTING MEANS THEREFOR

This invention relates to disc brakes, and particularly to expansion joints for the discs thereof.

Due to the energy released at the braking surface when a disc brake is operated, the disc tends to become very hot. When braking is severe, in a conventional disc large differences in temperature occur, the part of the disc which includes the braking path tending to become hotter than the bell part. Such temperature differences can lead to distortion of the disc, resulting in reduced braking performance, and ultimately to its fracture and the consequent total failure of the brake.

The use of expansion joints to relieve the thermal stresses in a disc set up by these temperature differences is known, but known designs have not proved the ultimate answer to the problem. It is an object of the present invention to provide an expansion joint in a disc unit which is easy to make, reliable and which does not rattle.

According to the present invention a brake disc unit comprises a disc supporting member, commonly a bell, and a disc secured thereto by a resilient clamping member, said member having axially projecting castellations fitting into corresponding radially directed slots in the disc.

The clamping member is preferably secured to the free end region of the castellations clamping the disc between itself and the bell. Conveniently the clamping member is a ring bolted to the free ends of at least some of the castellations.

It may also take the form of a "bellville" washer retained in position by a circlip located in a groove cut in a circumferential surface of the castellations inwardly of the disc.

The circumferentially opposed faces of the castellations and the corresponding faces of the disc slots are preferably arranged so that when the disc expands the clearance between the said faces is not significantly changed. The said faces may be radial of the disc.

The castellations preferably serve only to locate the disc against rotation relative to the bell. Location for axial position and squareness to the rotational axis is preferably by another surface at a different radius from the castellations, conveniently by a radially projecting annular rib on the bell. The said surface may easily be made to run true, e.g. by turning, in which case it is not necessary to maintain accurate axial depths of castellation.

Figure 2:
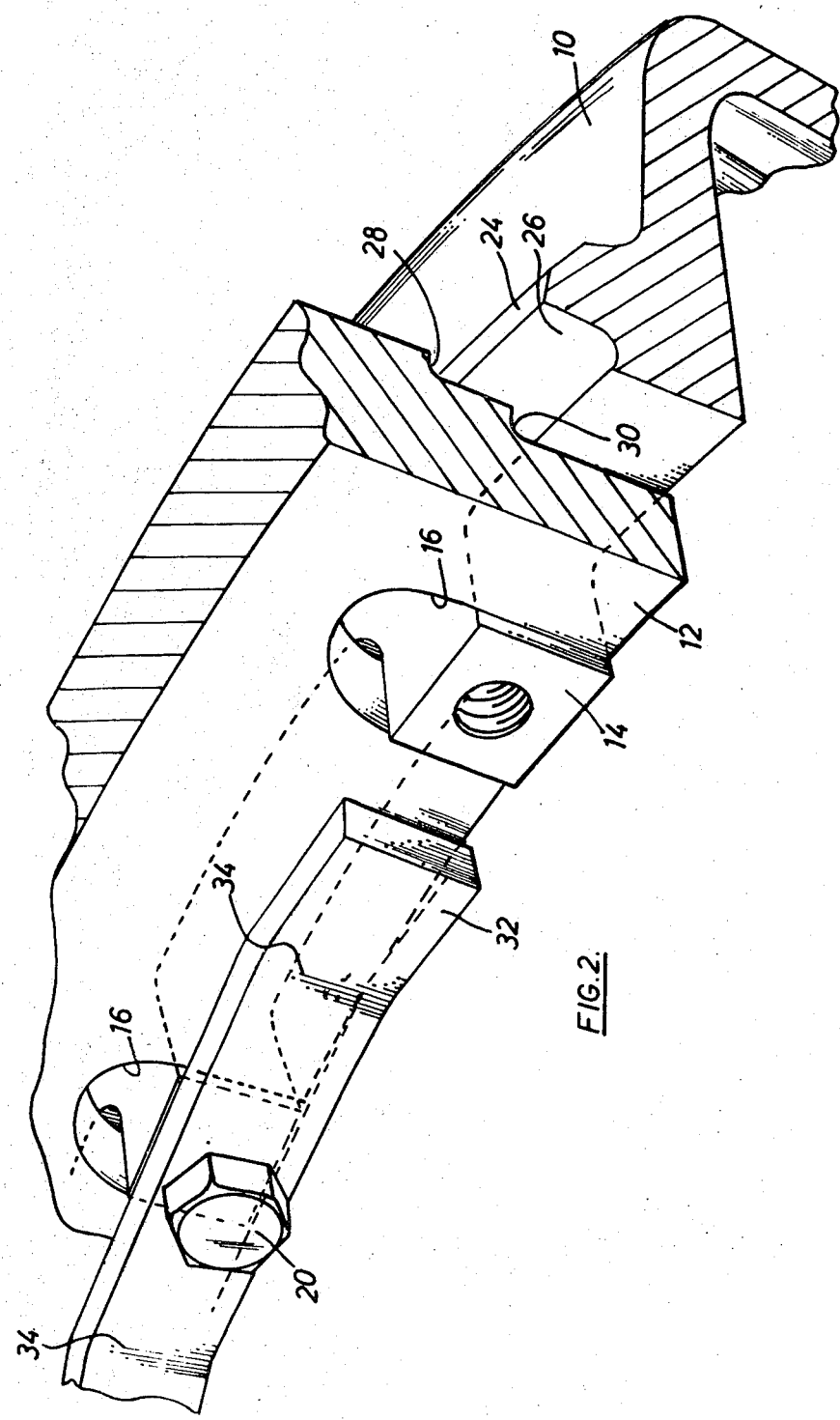
Figure 3:
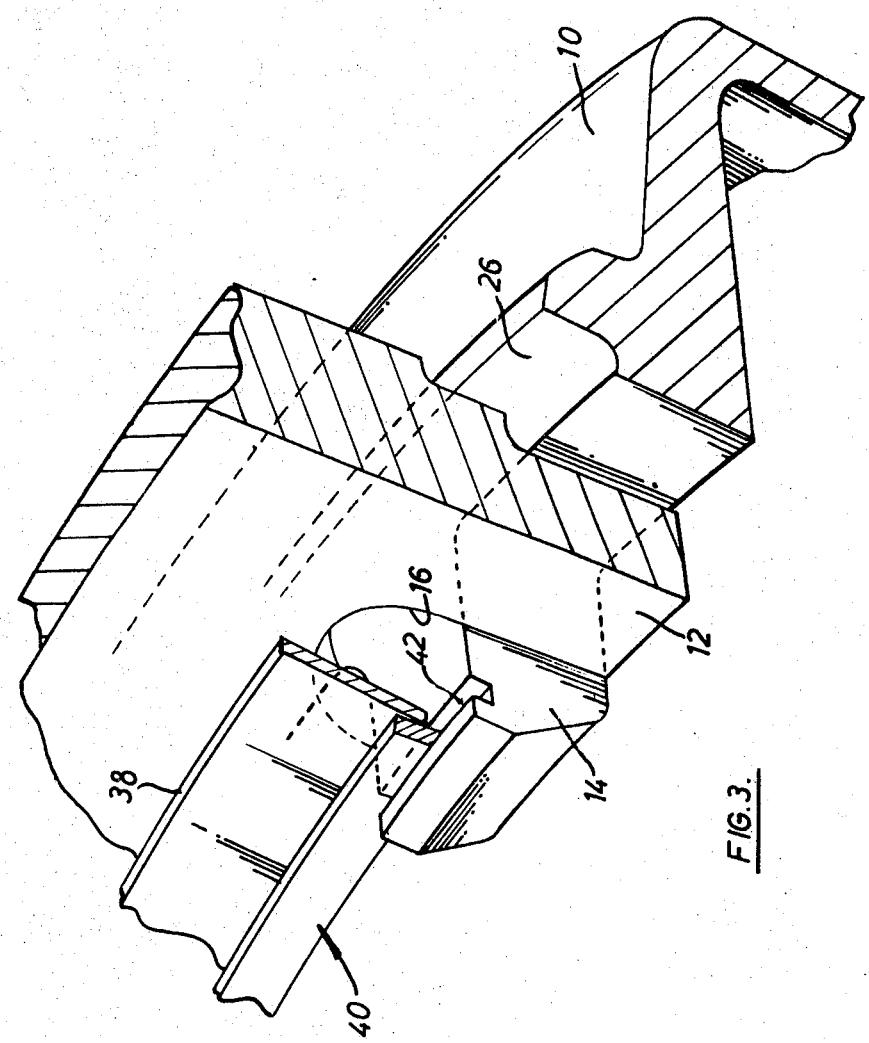

The invention will be further described by way of example with reference to the accompanying drawings, in which;

FIG. 1 shows a partially cut away perspective view of a disc unit according to the invention, FIGS. 2 and 3 show similar views of other embodiments of the invention.

Referring to FIG. 1, a disc unit comprises a bell 10 and a disc 12. The bell 10 has castellations 14 which project axially through slots 16 in the disc 12. A resilient clamping ring 18 is secured by bolts 20 to the castellations 14 and clamps the disc 12 against the bell 10 by contact only between the disc and surface 23 of an axial flange 22 of greater radius than the bolts 20. The shape of the ring is such that when the bolts are tightened it deforms elastically as a "bellville" washer to maintain a clamping force on the disc 12.

The bell 10 also carries a radial rib 24 one face 26 of which extends radially of the bell and locates the disc 12 axially in conjunction with steps 28 and 30 on the disc.

FIG. 2 shows another type of resilient clamping ring 32, which takes the form of a wavy washer. Upon assembly the ring is elastically deformed by tightening the bolts 20 so as to make contact in each wave with the disc 12 at region 34.

FIG. 3 illustrates yet another type of resilient clamping ring which also takes the form of a frustoconical "bellville" washer 38 retained by a circlip 40 located in a groove 42 cut in each castellation 14, the washer making continuous contact throughout its length with the disc 12.

The resilient clamping member loads the disc against the surface 26 of the rib 24 so that the resulting friction can prevent rattle. The lack of axial clearance between the disc and the rib surface 26 prevents distortion of the disc in an axial direction ("disc runout").

I claim:

1. A brake disc unit comprising an annular disc, a resilient clamping member, and an annular disc supporting member having a radially extending inner face, said inner face having a plurality of integrally formed castellations extending axially therefrom and having a rib spaced axially from said face and upstanding radially outwardly from said supporting member, said rib having a radially-extending face on the axially inner surface thereof, said disc having open radial slots therethrough, each of said castellations engaging slidably in a respective one of said slots and having free ends exposed through the inner ends of said slots, and fastening means connected to said exposed ends of said castellations and acting on said clamping member to urge the same against said disc and locate the latter against said radially extending face on said rib.

2. In a brake disc unit wherein the disc is carried by a disc supporting member and has a portion of one face in contact with a radially extending face on said supporting member, radial slots extending through said disc, a plurality of castellations integral with said supporting member and extending axially therefrom, each of said castellations being slidably engaged in a respective one of said radial slots to allow for expansion of said disc and having end parts exposed through said slots, a resilient clamping member, and fastening means connected with the exposed end parts of said castellations and acting on said clamping member to urge the same into engagement with the face of said disc opposite the one face and resiliently bias the one face of said disc against the radially extending face of said supporting member.

3. A brake disc unit according to claim 2 in which said radial face is axially and radially spaced from said castellations.

4. A brake disc unit according to claim 2 wherein said clamping member has an axially thickened outer radial region which makes contact with said disc and said clamping member gains its resilience from deformation upon being tightened against said castellations.

5. A brake disc unit according to claim 2 wherein said clamping member is a wavy washer and makes contact with said disc at a radially extending region between each two adjacent castellations.

6. A brake disc unit according to claim 2 in which said clamping member is a "bellville" washer and each said castellation has a groove in its radially outer face to accommodate a circlip whereby to maintain said washer against said disc when said washer is placed between said disc and said groove.

7. A brake disc unit according to claim 6 in which said "bellville" washer is frustoconical.

8. A brake disc unit according to claim 2 in which each said castellation is provided with circumferentially opposed faces to engage corresponding faces on said slots.

9. A brake disc unit according to claim 8 in which said circumferentially opposed faces are substantially radial.